T. JOHNSON.
RELEASE HOOK.
APPLICATION FILED SEPT. 8, 1919.
1,370,589.
Patented Mar. 8, 1921.
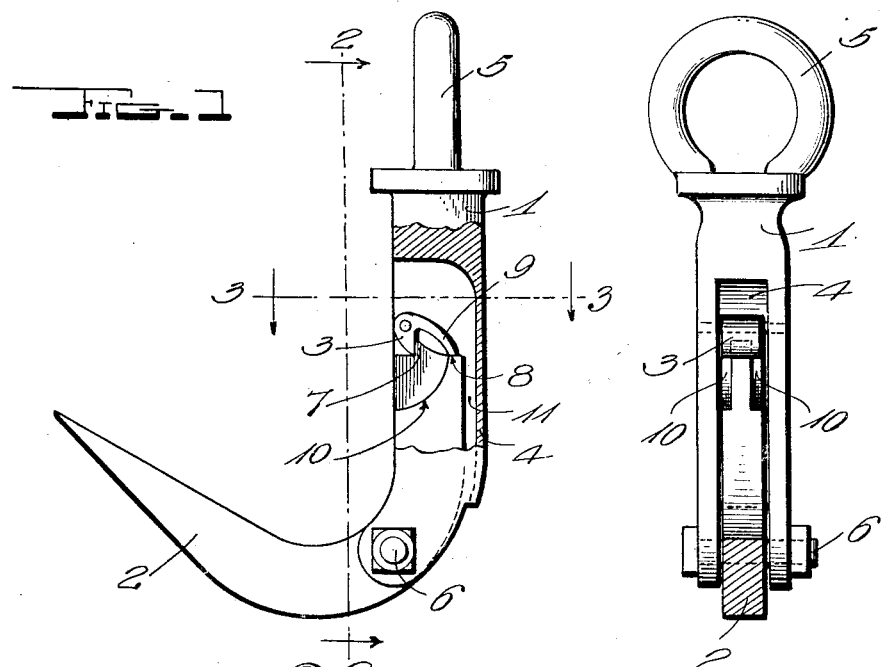
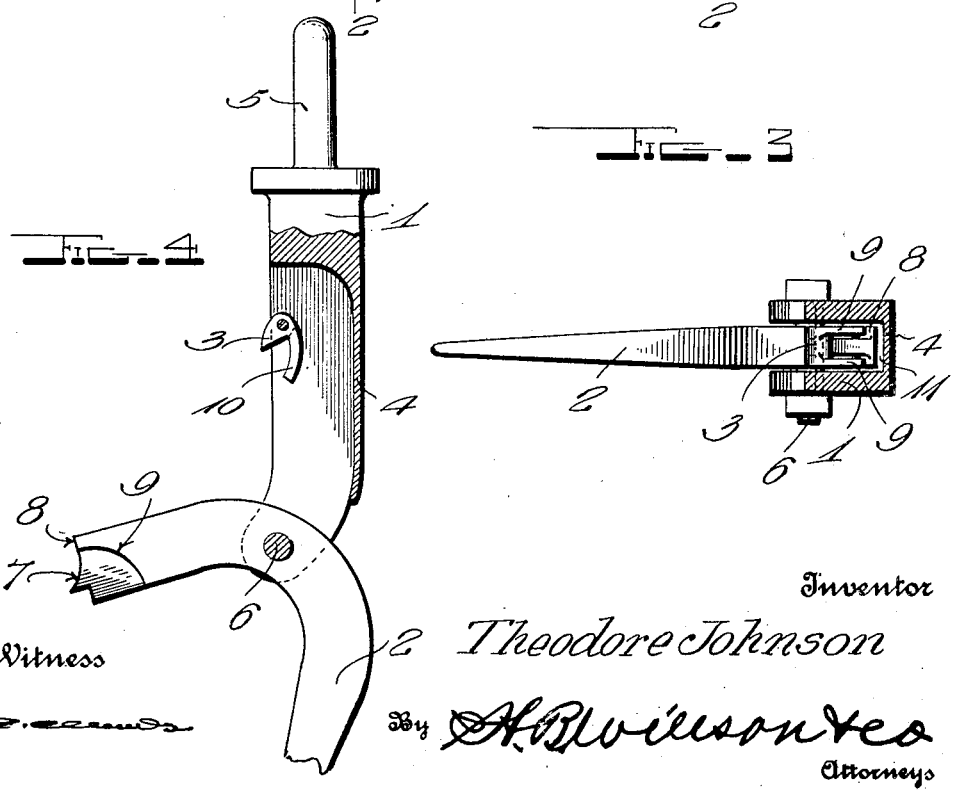
Inventor
Theodore Johnson
By H. B. Willson & Co.
Attorneys
Witness

UNITED STATES PATENT OFFICE.

THEODORE JOHNSON, OF ERIE, PENNSYLVANIA.

RELEASE-HOOK.

1,370,589.   Specification of Letters Patent.   Patented Mar. 8, 1921.

Application filed September 8, 1919. Serial No. 322,370.

*To all whom it may concern:*

Be it known that I, THEODORE JOHNSON, a citizen of the United States, residing at Erie, in the county of Erie and State of Pennsylvania, have invented certain new and useful Improvements in Release-Hooks; and I do declare the following to be a full, clear, and exact description of the invention, such as will enable others skilled in the art to which it appertains to make and use the same.

This invention relates to improvements in release hooks, having more particular reference to a meat hook such as is used in packing houses to hang beef, pork, etc.

The principal object of the invention is to provide a hook of the above mentioned type which will permit easy removal of a quarter or other portion of meat therefrom, thereby saving time, labor and expense.

Another object of the invention is to produce a hook of the mentioned character which is simple in construction, automatic in operation, easy to operate, strong, durable and inexpensive to manufacture.

Other objects and advantages of the invention will be apparent during the course of the following description.

In the accompanying drawings forming a part of this specification and in which like numerals are employed to designate like parts throughout the same, Figure 1 is a side elevation, partly in section, of a hook constructed in accordance with my invention.

Fig. 2 is a vertical section on the line 2—2 of Fig. 1.

Fig. 3 is a horizontal section on the line 3—3 of Fig. 1.

Fig. 4 is a view similar to Fig. 1, showing the hook-member in released position.

In carrying out my invention I employ a hollow supporting shank 1 to which I pivot a hook-member 2. I also employ a locking dog 3, which I pivot to the shank, and it is the purpose of this dog to hold said member 2 in load-suspending position, until the load engaging end of the latter is lifted, which action causes the dog to move to ineffective position, permitting said hook member to swing downward so that the load may be easily removed therefrom.

The shank 1 is substantially forked-shaped and has its rear face 4 closed, the purpose of which is to limit the rearward movement of the upper portion of the hook-member 2. The shank is provided with an attaching or suspending eye 5, which permits the device to be hung or suspended in the usual manner.

The hook-member 2 is pivoted at 6 to the shank and has its load-engaging portion tapered to a fine sharp point in the manner shown. The opposite end of upper portion of the hook-member is provided with an upwardly projecting shoulder 7, which, as shown, is rearwardly inclined. The portion 8 adjacent to the shoulder forms an abutment or stop, the purpose of which will hereinafter be more fully described. Curved recesses 10 are also formed on opposite sides of the shoulder.

The locking dog 3 is pivoted to the shank and is formed with a pair of spaced arms 9 which are of a length to permit them to straddle the shoulder 7 and normally bear on the abutment 8 of the hook-member, thus holding it in locked position, as more particularly shown in Fig. 1. When the parts are in locked position as illustrated in Fig. 1 there will be a space 11 between the portion 4 of the shank and the hook-member, whereby the said hook-member will be permitted to swing backward and clear the extreme ends of the arms 9 during the releasing operation of the hook.

When the device is in normal position, that is in the load-suspending or carrying position, the locking dog 3 is in engagement with the shoulder 7, arms 9 straddling the said shoulder and bearing on the abutment 8, as shown in Fig. 1. We will assume that in this position a portion of beef or other meat is being suspended. Now, when it is desired to remove the meat or load the hook, the operator will place his shoulder underneath it and slightly elevate the load-engaging end of the hook-member 2. This operation will cause upper portion of the hook-member to rock backward on its pivot 6 and strike the closed portion 4 of the shank, the rearward movement thereof being limited by said portion 4. Hence it will be seen that the dog 3 will automatically drop, because of its weight, into the curved recesses 10, thus becoming disengaged from the shoulder 7 and abutment 8 and permitting the hook-member to swing downward as shown in Fig. 4, in which position the load or meat may be readily removed from the hook.

To set the hook in locked position again it will only be necessary to elevate the load-engaging end, the dog being in such position as to automatically assume its effective position again, as is believed obvious.

My improved hook is effective and automatic in operation and is extremely easy to use, and when in a locked position will support heavy or light loads, there being no possibility of parts being released until caused to do so by the user.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim is:

1. A release hook comprising a shank, a hook member pivoted thereto, an independent locking dog also pivoted to said shank, and co-acting means between the dog and hook member for retaining the latter normally in load-suspending position, whereby when the load-engaging end thereof is elevated, the opposite end will move toward the shank and cause said co-acting means to become ineffective and permit the hook to move to an effective position.

2. A release hook comprising a shank, a hook member pivoted to said shank, being provided with an upstanding shoulder and an abutment, and a locking dog pivoted to the shank, being provided with a portion engaging the shoulder for holding said member in load-suspending position, and being also provided with a portion bearing on the abutment for retaining the dog in effective position, said dog being permitted to move to effective position when the load-engaging end of said member is elevated, which operation moves the shoulder and abutment from beneath the locking dog.

3. A release hook comprising a shank, a hook member pivoted between its ends to said shank, being provided on its upper end with an upstanding shoulder, a horizontal abutment, and on one side of the latter with a recess, and a locking dog pivoted to said shank, being provided with a portion engaging said shoulder and an arm bearing on said abutment, thus retaining the member in load-suspending position and permitting it to move to an effective position when its load-engaging end is elevated and causes the shoulder and abutment to move from engagement with said dog.

4. A release hook comprising a substantially hollow shank, a hook member pivoted to said shank and provided at one end with an abutment and an upstanding shoulder, being also provided on its opposite sides with curved recesses, and a locking dog pivoted to said shank, including a portion engaging said shoulder to retain the member in load-suspending position, and a pair of arms which straddle the shoulder and bear on said abutment, serving to retain the dog in ineffective position, and permitting it to move to ineffective position when the load-engaging end of the hook-member is elevated.

5. A releasing hook comprising a shank, a hook pivotally connected with the shank and having a stem extending longitudinally of the shank when the hook is in an operative position and a latch pivotally connected with the shank and adapted for engagement with the stem, the latch holding the hook against movement in one direction when in engagement with the stem and the stem retaining the latch in an operative position until moved in an opposite direction out of engagement with the latch.

In testimony whereof I have hereunto set my hand.

THEODORE JOHNSON.